United States Patent [19]
D'Ausilio

[11] 3,715,627
[45] Feb. 6, 1973

[54] PRE-FORMED ELECTRICAL WIRING SYSTEM

[76] Inventor: Robert F. D'Ausilio, 16354 Grayville Drive, La Mirada, Calif. 90638

[22] Filed: May 13, 1971

[21] Appl. No.: 142,949

[52] U.S. Cl. ............... 317/99, 317/120, 307/147, 339/23, 174/48, 174/70 C
[51] Int. Cl. .................................. H02b 1/08
[58] Field of Search ...317/99, 120; 174/48, 49, 70 C, 174/72 R, 72 C; 339/22 R, 23, 38; 307/42, 147

[56] References Cited

UNITED STATES PATENTS

| | | | |
|---|---|---|---|
| 3,243,754 | 3/1966 | Miller | 339/22 R |
| 3,308,416 | 3/1967 | Boyd | 339/22 R |
| 3,336,560 | 8/1967 | Myers | 339/22 R X |
| 3,432,677 | 3/1969 | Meyers | 307/147 X |
| 3,546,360 | 12/1970 | Bailey | 174/48 |
| 3,582,669 | 6/1971 | Dempsey | 307/42 X |
| 2,425,823 | 8/1947 | Parsons | 174/48 X |
| 2,611,800 | 9/1952 | Naughton | 174/49 X |
| 3,131,014 | 4/1964 | Munoz et al. | 339/38 |
| 3,387,252 | 6/1968 | Rothweiler | 339/38 |
| 1,137,489 | 4/1915 | Jellinek | 174/72 C X |
| 1,668,953 | 5/1928 | Erickson | 174/70 C |
| 1,861,675 | 6/1932 | Wolfson et al. | 174/70 C |
| 2,190,196 | 2/1940 | Semenyna | 339/22 R |
| 2,647,242 | 7/1953 | Kutcka | 174/72 C X |
| 3,580,984 | 5/1971 | Gladh | 174/48 |

*Primary Examiner*—Richard B. Wilkinson
*Assistant Examiner*—Stanley J. Witkowski
*Attorney*—Francis X. Lo Jacono, Sr.

[57] ABSTRACT

An electrical wiring system which includes a preformed, conductive, main trunk line and a plurality of off-shoot lines having two or more conductive wires embedded within a molded body of insulation, and at least one soft metal wire to enable pre-forming of the lines for installation within a molded structure. The system also includes components such as a main circuit-breaker box, individual plug-in circuit breakers, receptacles, light switches, and dummy blocks which are used when forming the molded structure to provide openings therein to receive the various components.

6 Claims, 9 Drawing Figures

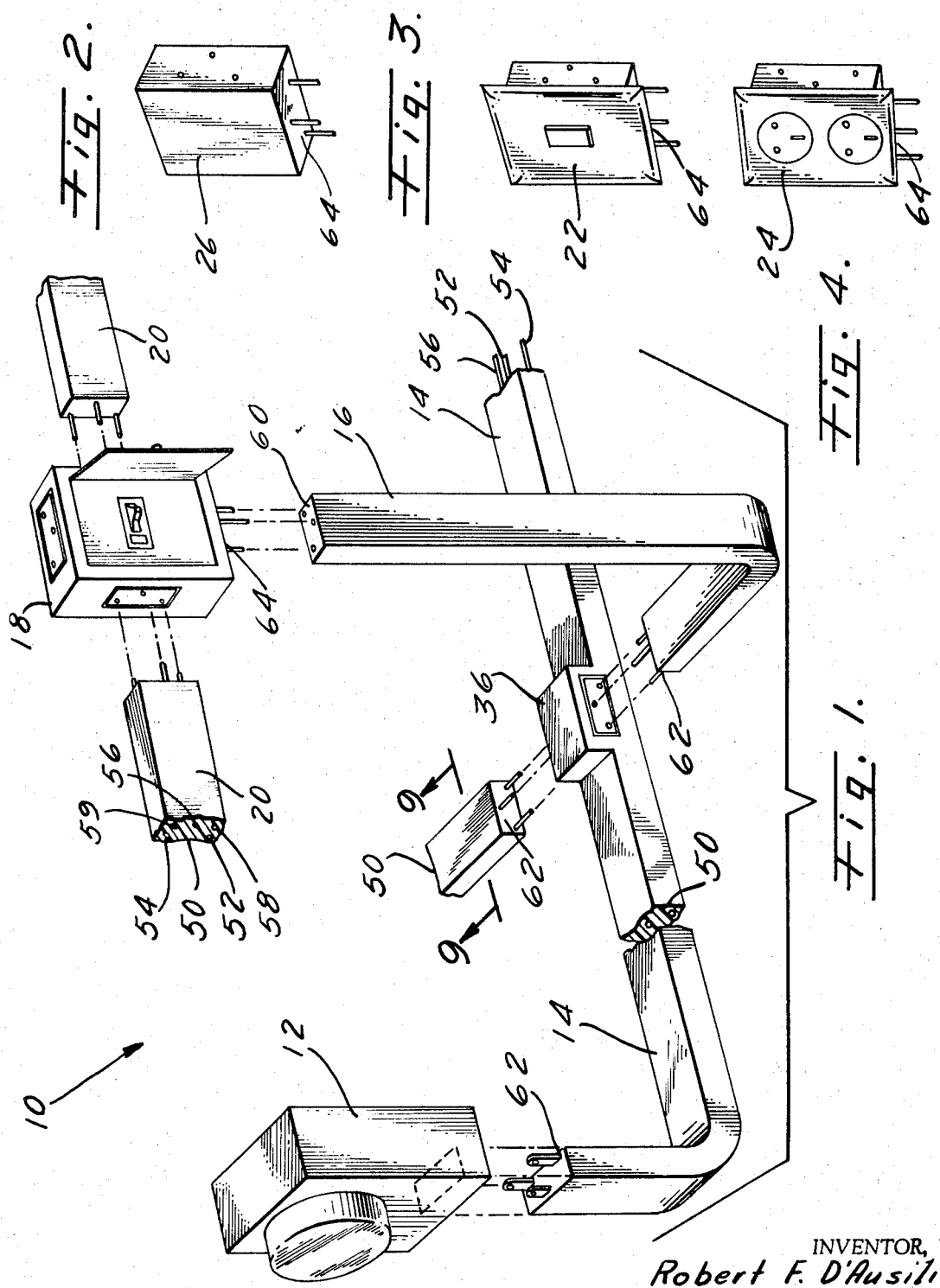

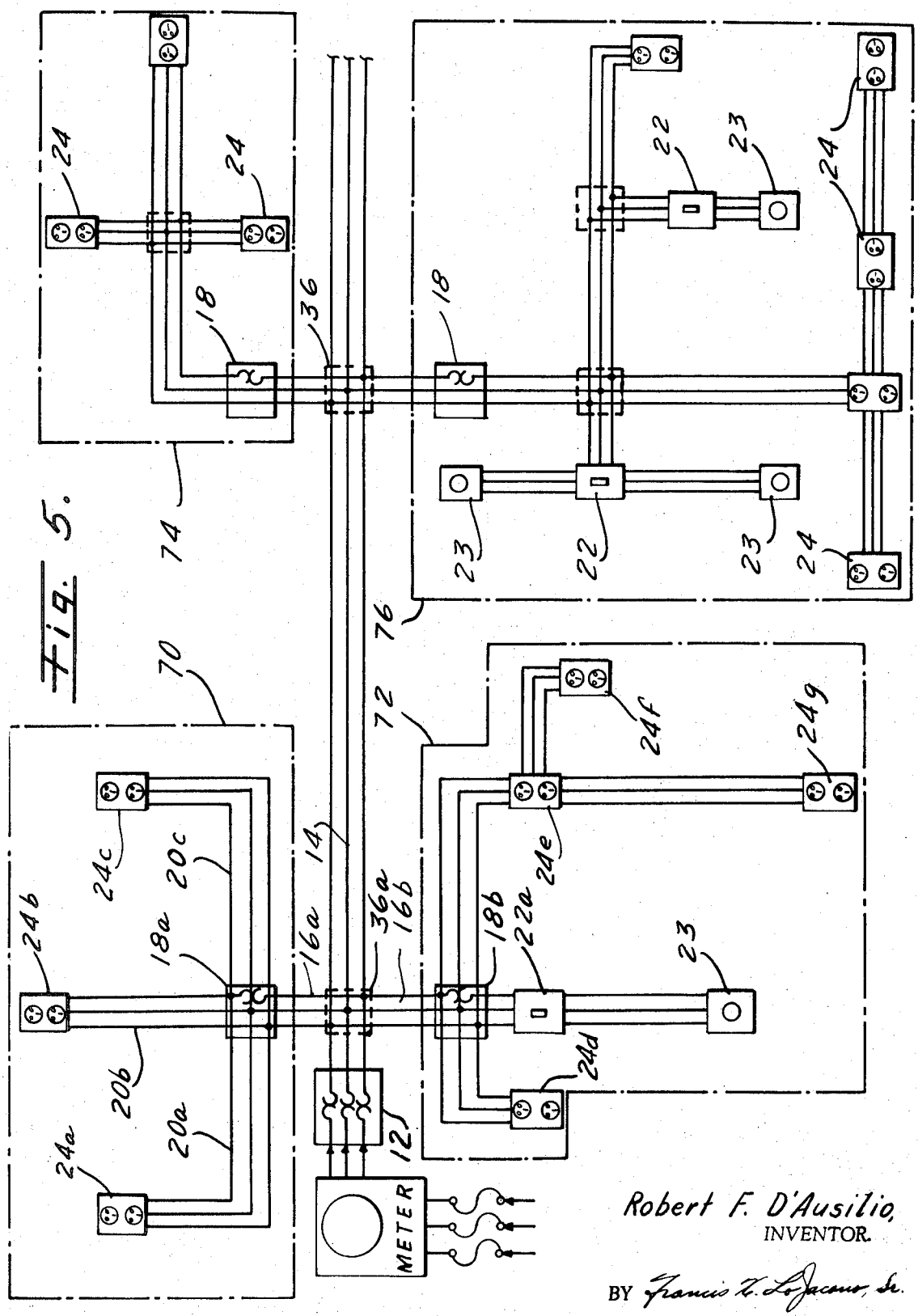

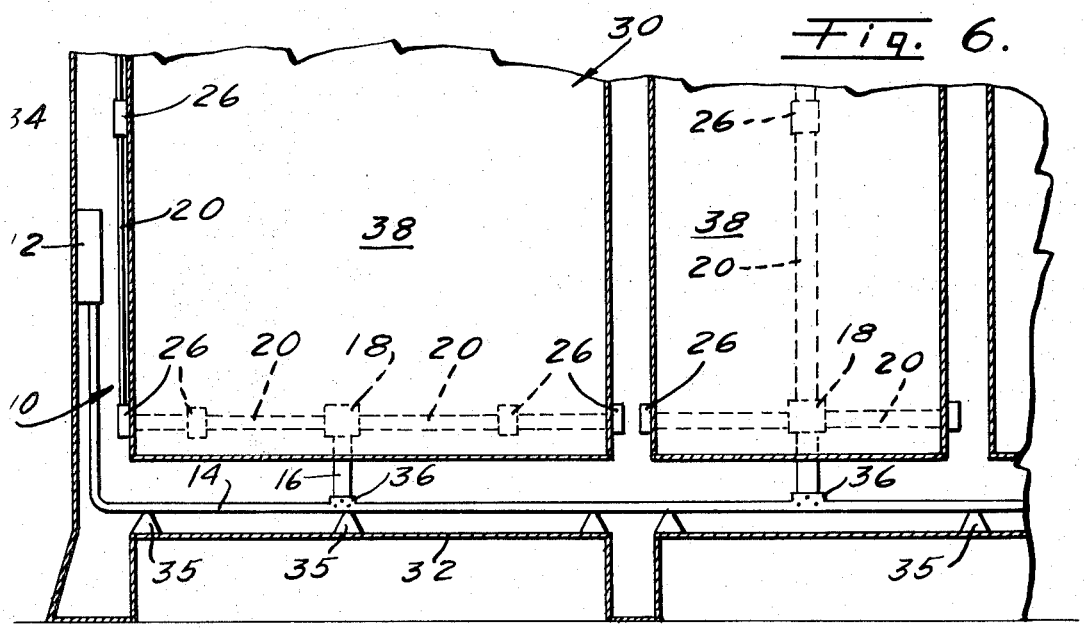
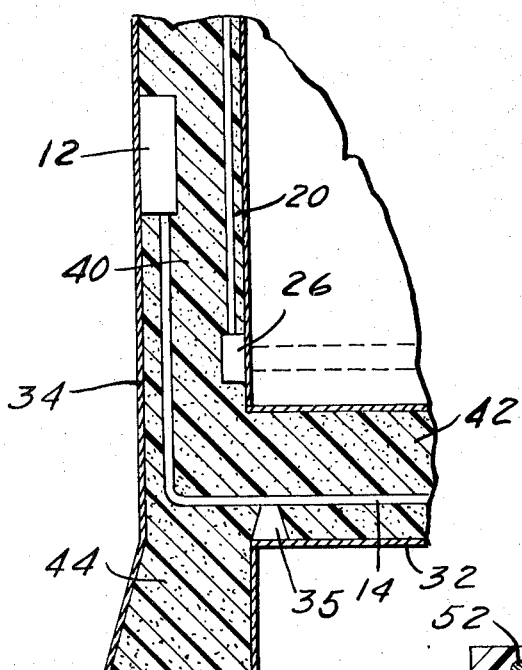
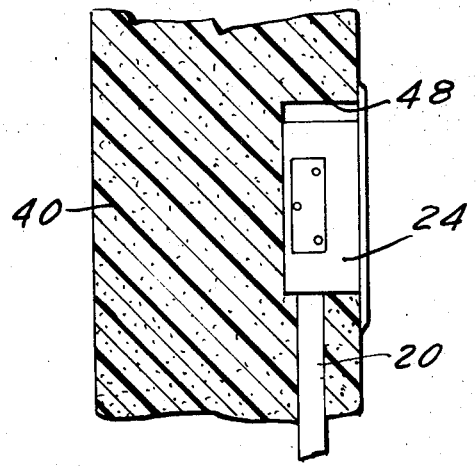
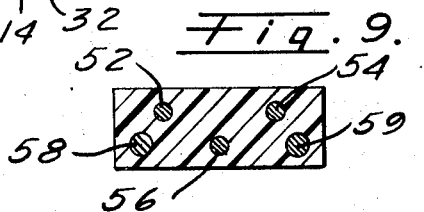
INVENTOR.
Robert F. D'Ausilio
BY
Agent

PRE-FORMED ELECTRICAL WIRING SYSTEM

BACKGROUND OF THE INVENTION

1. Field of the Invention

This invention relates generally to a conductive wiring system, but more particularly to a conductive wiring system which is pre-formed to be installed within a molded structure.

2. Description of the Prior Art

As is well known in the art, various types of wiring systems have been used and are presently available. However, problems and difficulties are being encountered in providing proper wiring systems that are to be installed within molded structures, particularly monolithic buildings such as houses, apartment buildings and the like. The problems that now exist in this advanced art have not, up to the present time, bee solved. The monolithic building is comprised of a continuous peripheral wall, floors, foundation, partition walls, arches, counter tops, etc., as well as plumbing and wiring. Therefore, it can be seen that in this type of structure the wiring has to be installed within the mold at the time the mold is constructed. Hence, there is no exposed wiring at any point within the structure when the mold is removed from the finished form. The prior art does not teach or suggest molded conductors that are capable of being formed to fit within a structure mold and, at the same time, capable of maintaining their form.

In the U.S. Pat. No. 3,264,791, it is suggested that a wiring duct system be used within a structure. However, this system is not practicable for use in a monolithic molded structure, due to the lack of its versatility and capability within a mold. If ducts could be designed to fit within the mold, the maze of ducts would be such that it would be impossible to run electrical conduits, or conductive lines, to each required switch or outlet in the walls, as well as to the ceiling fixtures.

SUMMARY OF THE INVENTION

This invention provides a pre-formed wiring system for use in a molded structure and, in addition, it provides a method by which a molded structure such as a house, apartment, or any other type of dwelling or the like, can be installed with a preformed wiring system. The pre-formed wiring system comprises a main trunk line and a number of off-shoot lines, the off-shoot lines being adapted to receive secondary off-shoot lines.

Each line is comprised of a molded body of insulation having a plurality of conductive wires embedded therein, and is also provided with at least one soft metal line to provide a means for forming any one particular line to any shape that would be required within the molded structure, whereby the line or lines can properly be disposed while the mold material, such as a liquid form of plastic or concrete, is poured within the mold structure, encasing the wiring system therein.

The trunk line is adapted with a plurality of junction boxes spaced along the line in a predetermined relationship to each other, the junction boxes having a female connection to accommodate male connections of the off-shoot lines, wherein the opposite, free-connecting ends of the off-shoot lines are also provided with female connections to prevent exposure of hot lines during any phase of installation or repairs of components.

When the off-shoot lines are in place, false dummy component boxes are snapped into position to take the place as the actual working components, such for receptacles, wall switches and circuit-breaker boxes. After the structure is molded and removed from the molds, the dummy boxes are then removed, and the actual working components are inserted in the exposed opening of the walls and connected to the female ends of the line terminating within the opening. Each component is designed with a male insert to match the female connection of each terminating line and is also adapted with female inlets, if additional off-shoot lines have been designed in its particular circuit for additional wiring within a given area.

A typical main circuit-breaker unit is supplied at the forward end of the trunk line which will generally extend from one of the outer walls along the central portion within the molded floor. From the trunk line each room of the molded structure is connected by an off-shoot line having its opposite terminating end in a wall opening within the particular room. At this point, a second local circuit breaker is installed, each room of the structure being so equipped with its own local circuit-breaker unit. From this unit the secondary lines are connected, supplying each receptacle, switch and outlet with electrical power for that particular room. Therefore, if an electrical overload occurs in any one particular room, the local circuit breaker will automatically cut power to the entire room. Thus, when the problem is corrected the electrical power is again turned on by resetting the local circuit-breaker unit, therefore eliminating the necessity of manipulating the main circuit breaker on the outside of the structure.

OBJECTS AND ADVANTAGES OF THE INVENTION

The present invention has for an important object the provision of a pre-formed, self-standing electrical wiring system adapted to be embedded within a molded structure, including particularly a monolithic structure.

It is another object of the invention to provide a preformed wiring system having removable, plug-in components, such as wall switches, receptacles and the like.

It is still another object of the invention to provide a pre-formed, self-standing electrical wiring system for molded structures which may be manufactured and pre-formed at the factory to fit accurately the structure to be molded.

A further object of the invention is to provide a device, or apparatus, of this character which comprises at least two or more electrical conductors with provisions to connect at selected points to separate branch circuits in parallel along the trunk line.

It is still a further object of the invention to provide a device, or apparatus, of this character with branch circuit wiring having two or more electrical conductors which are capable of being form fitted to a structure mold and maintaining their formed position by the use of one or more soft steel wires embedded within the electrical conductors in the same insulated body.

Still another object of the invention is to provide an independent circuit breaker for each branch line connecting directly to the trunk line without the necessity of running each branch to a central circuit breaker, so that the branch circuit breaker can be reset in each local area.

A still further object of the invention is to provide a pre-formed, self-standing electrical wiring system wherein the entire system is molded into the walls, floor or ceiling, using dummy blocks to provide spaces for branch circuit breakers, switches, outlets and the like, such that after the wiring is entirely covered the blocks can be removed and the branch components can be inserted in their place.

Another object of the invention is to provide a device of this character wherein the trunk line has predetermined, spaced female connectors in which the male ends of the branch lines are connected and wherein the branch lines are provided with female connectors at their opposite ends to receive the branch circuit breaker male ends.

It is still another object of the invention to provide a pre-formed wiring system having its free ends thereof terminating with a female end, whereby the hot conductor wires are not exposed.

Still a further object of the invention is to provide a device, or apparatus, of this type having integral branch components wherein each of the components are molded to include a face plate thereon.

Other characteristics, advantages and objects of the invention can be more readily appreciated from the following description and appended claims. When taken in conjunction with the accompanying drawings, this description forms a part of the specification wherein like references and characters designate corresponding parts in several views which are as follows.

DESCRIPTION OF THE DRAWINGS

Referring more particularly to the accompanying drawings, which are for illustrative purposes only:

FIG. 1 is a partial, exploded, perspective view of the invention;

FIG. 2 is a perspective view of a dummy block;

FIG. 3 is a similar perspective view of a wall switch;

FIG. 4 is, also, a perspective view of an outlet receptacle, with a ground provision;

FIG. 5 is a diagrammatic view showing a typical layout of a wiring system and components for a four-room, molded structure;

FIG. 6 is a partial sectional view of a mold assembly having the invention positioned therein prior to pouring the casting material;

FIG. 7 is a partial sectional view of a mold assembly including the pre-formed wiring system embedded within the mold material;

FIG. 8 is a partial cross-sectional view of a molded wall showing a component positioned therein; and FIG. 9 is a cross-sectional view taken on line 9 of FIG. 1 showing the conductor wires in the soft-forming wires embedded within the insulated body.

DESCRIPTION OF THE PREFERRED EMBODIMENT

Referring to the drawings and, more particularly, to FIG. 1, there is shown a portion of the pre-formed electrical wiring system, generally indicated by reference character 10. Generally, the wiring system 10 comprises a main circuit breaker 12, which is disposed in the outer face of the outside wall of a structure, a main trunk line 14 having means therein to receive branch off-shoot lines 16 which are adapted to receive a local, secondary branch circuit breaker 18, to which secondary off-shoot branch lines 20 are connected. Each free terminating end of the secondary line is provided with means to receive various plug-in components, such as a wall switch 22, outlet receptacle 24, and a dummy block 26 which is used during the actual molding operation of the structure and is removable from said structure so that other various operable components may be substituted therein.

Now, to be more specific, the pre-formed, self-standing wiring system as disclosed is designed to be molded within a molded structure, particularly a monolithic molded building having a continuous peripheral wall, floors, foundation, partition walls, arches, and including ducting, plumbing and the necessary wiring. It should be understood, however, from the following description that various other pre-fabricated structures can also be incorporated into the basic invention as herein disclosed.

Since a monolithic building is cast in one piece, the wiring is required to be disposed within the mold prior to pouring the casting material. This is illustrated in FIG. 6 where there is shown a mold, generally indicated at 30, having a separate floor mold section 32, around which are disposed outer wall mold sections 34. Thus, when these mold sections are in place the main circuit breaker 12 is installed, as seen in FIG. 6, and the main trunk line 14 is connected thereto and positioned centrally along the floor mold section. In order for the lines to properly embedded within the casting material, jacks or blocks 35 are provided to raise the lines sufficiently above the floor section.

Since the trunk line is adapted with means for receiving branch off-shoot lines 16, the means are formed as an integral junction box 36 having a pair of oppositely-disposed female outlets to which the branch lines 16 are connected. However, it is necessary that the junction boxes be properly located on the trunk lines so that, when a core mold section 38 is positioned within the outer peripheral wall 34, said junction boxes will properly correspond thereto along with the additional wiring system.

At this point, it should be mentioned that three possible steps can be taken with respect to placing the core in its proper position. First, the core can be positioned in place prior to the outer walls, allowing complete assembly of the wiring system. Second, the core can be lowered with part of the system previously attached thereto, said system being completed when said core is in place. It should be understood that in this step a prefabricated wall can take the place of the core, with the wall provided with the necessary off-shoot lines and components for completing the wiring system. Or, third, which is the preferred step, the entire wiring system can be assembled at the factory and then installed above the floor section, thereafter placing the outer wall molds into position and then finally lowering the core mold section as a last unit before the casting is poured. Further, it can be seen in FIGS. 5 and 6 that secondary circuit breaker 18 will be located within a given area, having secondary lines 20 leading therefrom to other locations within its associated area. A more detailed description of the system arrangement in FIG. 5 will hereinafter be described in more detail.

Referring now to FIGS. 7 and 8, there is shown the casting which has taken place with a mold wall 40, a floor 42 and a foundation 44 having been molded with the prehformed electrical system embedded within the solidified material. At this time, the operating components are not in place. That is, the dummy block 26, as shown in FIG. 2, is in the system 10 until the mold sections are removed, as seen in FIG. 8, at which time each dummy block is removed, providing a recess 48 within the wall. This recess will be generally larger than the component that is to be disposed therein, thereby providing room for the male plugs to freely enter the female ends of the branch lines 20.

The trunk line and branch off-shoot lines are all constructed in the identical manner. Hence, the lines are formed from two or more wire conductors embedded within an elongated body 50 of insulation, preferably composed of a pliable plastic. As illustrated in FIG. 9, the plastic body 10 has embedded therein three conductive wires 52, 54 and 56, respectively. Wires 52 and 54 represent the hot lines of the circuit while the third line 56 is the ground wire used throughout the system. Additional conductive lines can be added when there is a requirement for them in any particular structure to be built.

Wires 58 and 59, which also are embedded within the body 50, are in themselves formed from soft metal, preferably steel. By proper arrangement of wires 58 and 59 within the body, they cannot at any time be used for conducting electrical current but are used only as a means to pre-form the various bends that might be necessary for installation within the mold structure 30. Generally, each line is provided with a female end 60 and an opposite male end 62. Since the terminating ends are arranged as female outlet connections, at no time within the electrical system are the hot lines exposed. It is to be noted that each component is, therefore, adapted with male connecting ends 64 which are identical to those used on each conductive line. Female connecting outlets 66, however, are provided in each side and the top of each component, as seen in FIG. 1 of the local circuit breaker 18, and in FIGS. 2, 3 and 4 of the dummy block 26, switch 22 and receptacle 24, respectively.

It is also should be noted that it is contemplated that each switch, receptacle and like components are provided with integral cover plates so that proper and complete coverage of the recess 48 in the wall 40 can be accomplished at the time each component is installed.

Each pre-form, free-standing wiring system will be designed to conform to the requirements of each designed structure. As an example, I now refer to FIG. 5 in which there is shown, schematically, four individual rooms, indicated by reference numerals 70, 72, 74 and 76, respectively, and outlined by phantom lines. These rooms are part of a molded monolithic house, as previously described, having a main circuit breaker 12 connected to a three-wire trunk line 14, said trunk line having junction boxes 36. In each FIG. 5 there is a junction box 36a which feeds branch lines 16a and 16b, respectively. Line 16a connects to the local circuit breaker 18 located in room 70 and is, in turn, connected by secondary lines 20a, 20b and 20c to outlets 24a, 24b and 24c, respectively, thereby providing room 70 with the necessary electrical wiring. Line 16b, which is oppositely connected to junction box 16a, leads to a local circuit breaker 18b located within the room 72. However, this room is designed to require additional components, such as switch 22a for controlling a socket light outlet 23 along with a plurality of outlets 24d, 24e, 24f and 24g. Therefore, it should be clear that rooms 74 and 76 can be provided with many various configurations, as shown, or as might be required by plugging in the necessary components.

The invention and its attendant advantages will be understood from the foregoing description and it will be apparent that various changes may be made in the form, construction and arrangement of parts of the invention without departing from the spirit or scope thereof, or sacrificing its material advantages, the arrangements hereinbefore described being merely by way of example, and I do not wish to be restricted to the specific forms shown or uses mentioned, except as defined in the accompanying claims.

I claim:

1. A pre-formed electrical wiring system for a molded monolithic building structure comprising:
    a main circuit breaker;
    a main trunk line, one end of which is connected directly to said main circuit breaker;
    a plurality of receiving means predeterminedly positioned along said main line and formed thereto as an integral part thereof, said receiving means comprising a junction box having oppositely-disposed female outlets therein;
    a plurality of plug-in electrical components;
    a plurality of first branch lines wherein each of said branch lines has at least one end thereof with male-connecting means being removably connected to said receiving means;
    a plurality of secondary branch lines, the ends of which are removably secured to said electrical components; and
    a secondary branch circuit breaker having at least one male-connecting means and at least one female outlet, and being operably disposed between said first branch line and said secondary branch line.

2. A pre-formed electrical wiring system as recited in claim 1, wherein said first and second branch lines have at one of their ends thereof a male-connecting means and at their opposite ends a female outlet therein.

3. A pre-formed electrical wiring system as recited in claim 2, wherein said electrical components which are removably secured to one end of said secondary branch line are each comprised of an electrical wall switch, an outlet receptacle and a dummy component.

4. A pre-formed electrical wiring system as recited in claim 3, wherein each of said components include at least one male-connecting means and at least one female outlet therein.

5. A pre-formed electrical wiring system as recited in claim 3, wherein said trunk line and said first and second branch lines are comprised of a plurality of electrical conductor wires, and at least one pliable, non-conductive wire embedded within a body of insulation material, whereby said lines can be formed and held in a predetermined configuration.

6. A pre-formed electrical wiring system as recited in claim 3, wherein said wall switch and said outlet receptacle are pre-formed with a face plate thereon.

* * * * *